(12) United States Patent
Fischer (10) Patent No.: US 8,204,501 B2
(45) Date of Patent: Jun. 19, 2012

(54) CUMULATIVE NEIGHBORING CELL LIST

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 1019 days.

(21) Appl. No.: 12/026,379

(22) Filed: Feb. 5, 2008

(65) Prior Publication Data

US 2009/0197598 A1    Aug. 6, 2009

Related U.S. Application Data

(60) Provisional application No. 60/888,742, filed on Feb. 7, 2007.

(51) Int. Cl.
*H04W 4/00*    (2009.01)
*H04B 7/00*    (2006.01)

(52) U.S. Cl. ............... 455/434; 455/435.2; 455/515; 455/156.1; 455/161.1; 455/161.3

(58) Field of Classification Search ............ 455/435.2, 455/435.3, 432.1, 434, 436–443, 450
See application file for complete search history.

(56) References Cited

U.S. PATENT DOCUMENTS

| | | | |
|---|---|---|---|
| 5,946,621 A | 8/1999 | Chheda et al. | |
| 6,201,968 B1 * | 3/2001 | Ostroff et al. | 455/436 |
| 7,155,223 B2 * | 12/2006 | O'Brien | 455/436 |
| 2004/0121773 A1 | 6/2004 | O'brien | |

FOREIGN PATENT DOCUMENTS

FR    2866185    8/2005

* cited by examiner

*Primary Examiner* — Charles Appiah
*Assistant Examiner* — Emem Stephen
(74) *Attorney, Agent, or Firm* — Lee, Hong, Degerman, Kang & Waimey

(57) ABSTRACT

A method and apparatus for reducing the number of cells that must be broadcast and the number of cells that a mobile terminal must measure when different frequencies and technologies must be listed as neighboring cells.

16 Claims, 8 Drawing Sheets

-PRIOR ART-

Fig. 3

-PRIOR ART-

-PRIOR ART-

CUMULATIVE NEIGHBORING CELL LIST

CROSS-REFERENCE TO RELATED APPLICATIONS

Pursuant to 35 U.S.C. §119(e), this application claims the benefit of U.S. Provisional Application Ser. No. 60/888,742, filed on Feb. 7, 2007.

FIELD OF THE INVENTION

The present invention relates to reducing overhead due to broadcasting of neighboring cells when different frequencies and technologies must be listed as neighboring cells and, particularly, to reducing the number of cells that must be broadcast and the number of cells that a mobile terminal must measure.

DESCRIPTION OF THE RELATED ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
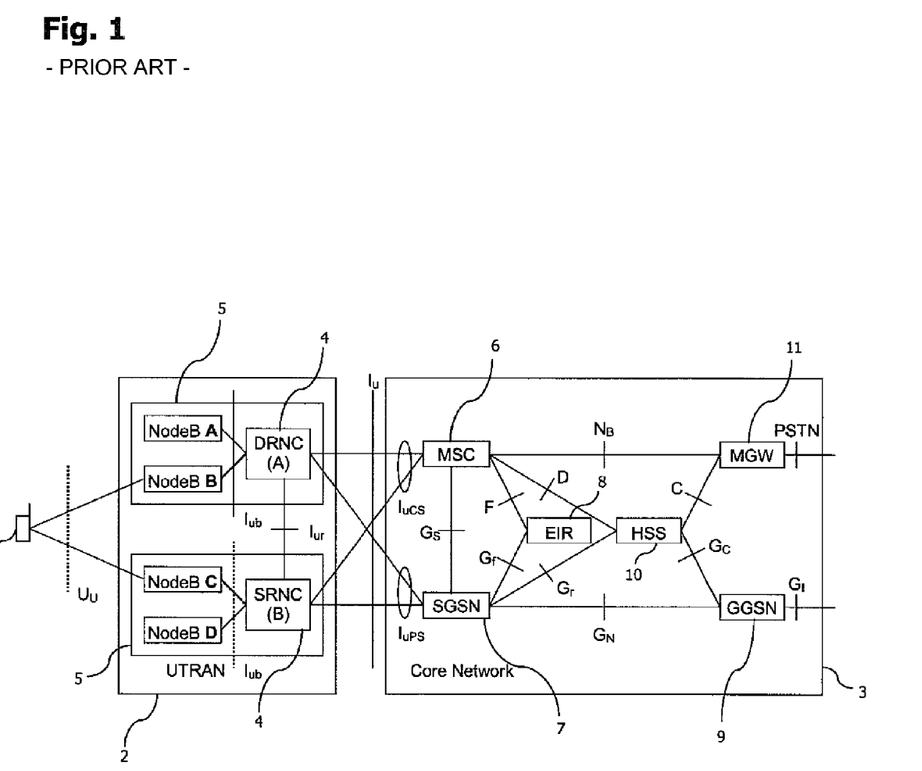
FIG. 1 illustrates an overview of a UMTS network.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $1_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the Gs interface, to the gateway GPRS support node (GGSN) 9 via the $G_N$ interface, and to the home subscriber server (HSS) via the $G_R$ interface.

The EIR 8 hosts lists of UEs 1 that may be used on the network. The EIR 8 also hosts lists of UEs 1 that may not be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

Figure 2:
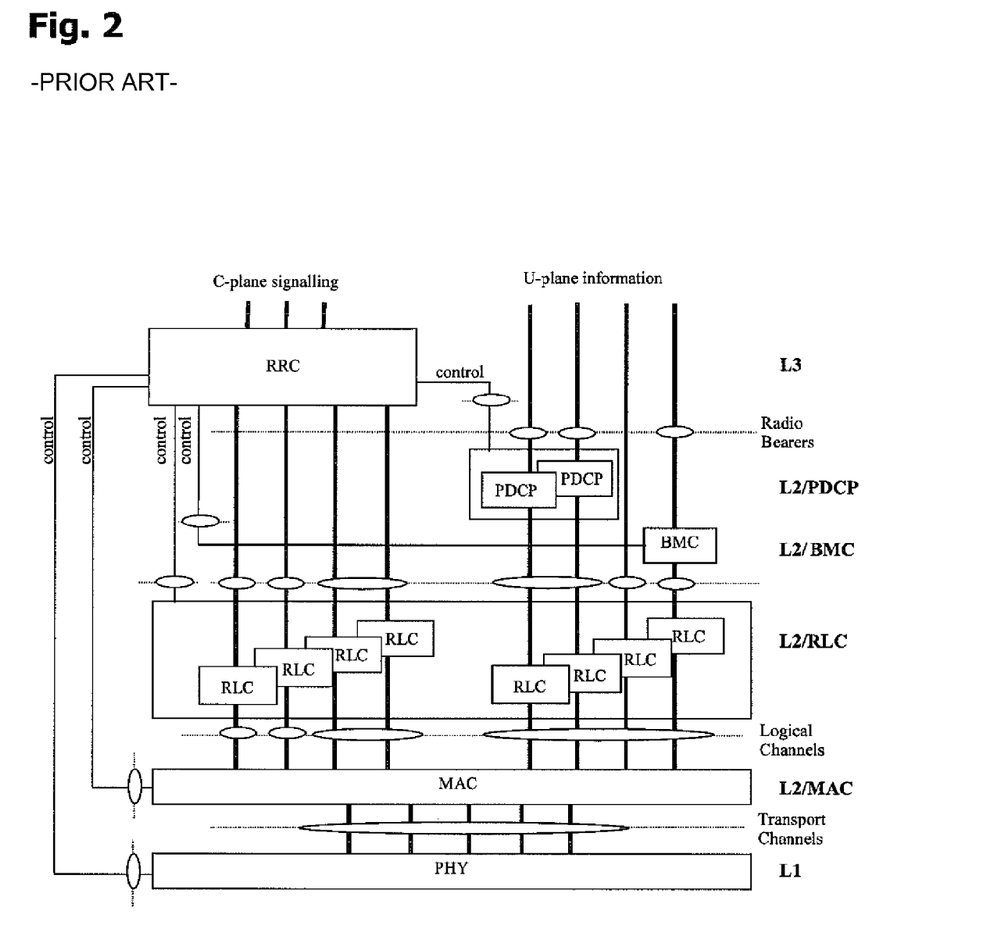
FIG. 2 illustrates a structure of a radio interface protocol between a UE and the UTRAN according to the 3GPP radio access network standards.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

Figure 3:
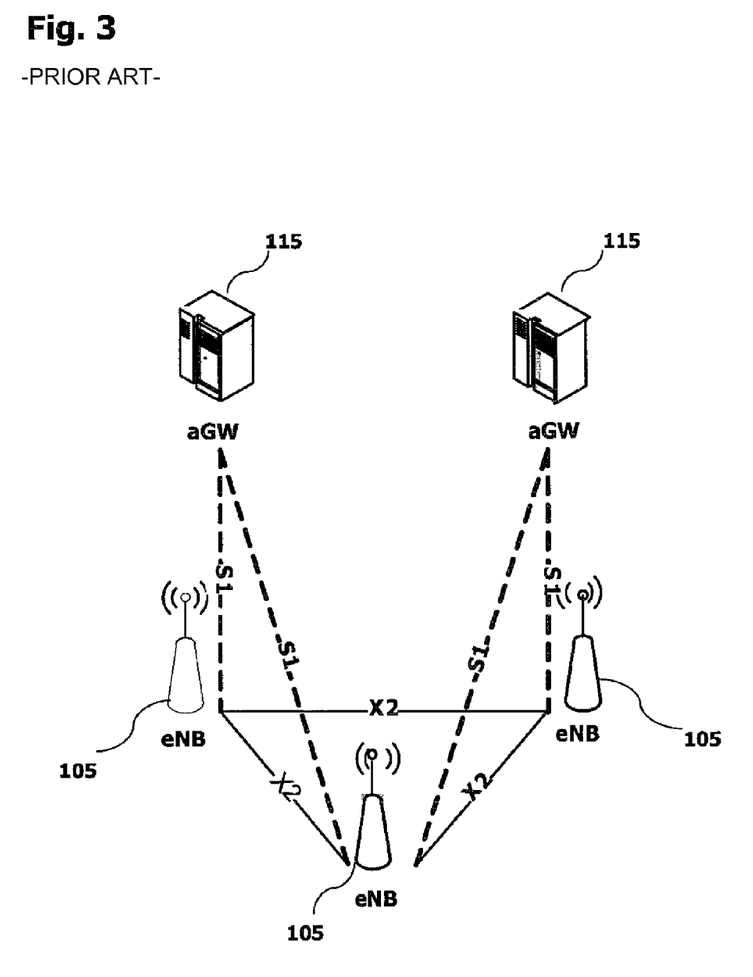
FIG. 3 illustrates the architecture of an LTE system.

FIG. 3 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) in the LTE system.

In conventional methods, a UE 1 must select a first cell of the radio access technology and check the suitability based on different criteria. The UE 1 then registers to the network and maintains a connection to the network by receiving system information and listening to paging messages, for example when the UE is camping on a cell from the network.

The UE 1 reads system information from the selected cell in order to be informed of information related to the neighboring cells of the network and maintain the connection to the network. The neighboring cells include cells from the same technology on the same frequency, cells from the same technology on different frequencies and cells from different technologies on different frequencies.

The UE 1 will periodically perform measurements on this neighboring cell list in order to reselect to better cells based on radio criteria. If the reception quality of the cell on which the UE 1 is camping degrades below a certain level the cell is no longer suitable. The UE 1 is then allowed to take into account cells that are not included in the neighboring cell list of the last cell on which the UE camped in order to find another suitable cell.

Figure 4:
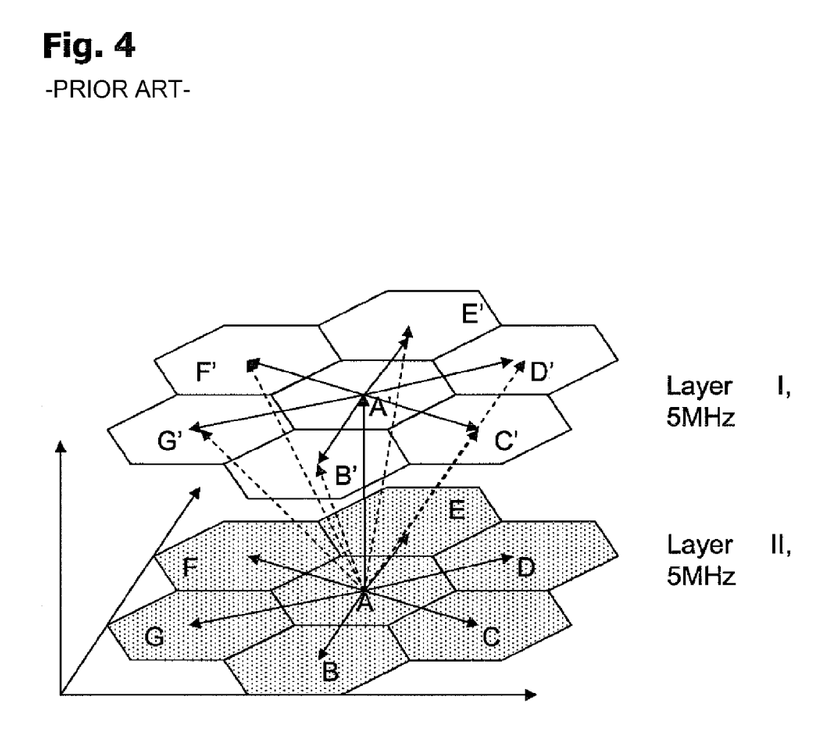
FIG. 4 illustrates an example of two frequency layers with collocated cells.

FIG. 4 illustrates an example where two frequencies are deployed. As illustrated in FIG. 4, the number of neighboring cells that must be broadcast in a given cell roughly doubles.

For example, cell 'A' would only need to broadcast the neighboring cells B, C, D, E, F and G if only the lower frequency, which corresponds to Layer I FIG. 4, is deployed. However, cells A', B', C', D', E', F' and G' also would have to be broadcast in cell A if the upper frequency, which corresponds to Layer II FIG. 4, is also deployed. The situation is similar if the UE 1 is able to use two different access technologies, such as UMTS and GSM or UMTS and LTE, although there are some additional impacts due to the coverage of the different technologies not necessarily being the same.

Figure 5:
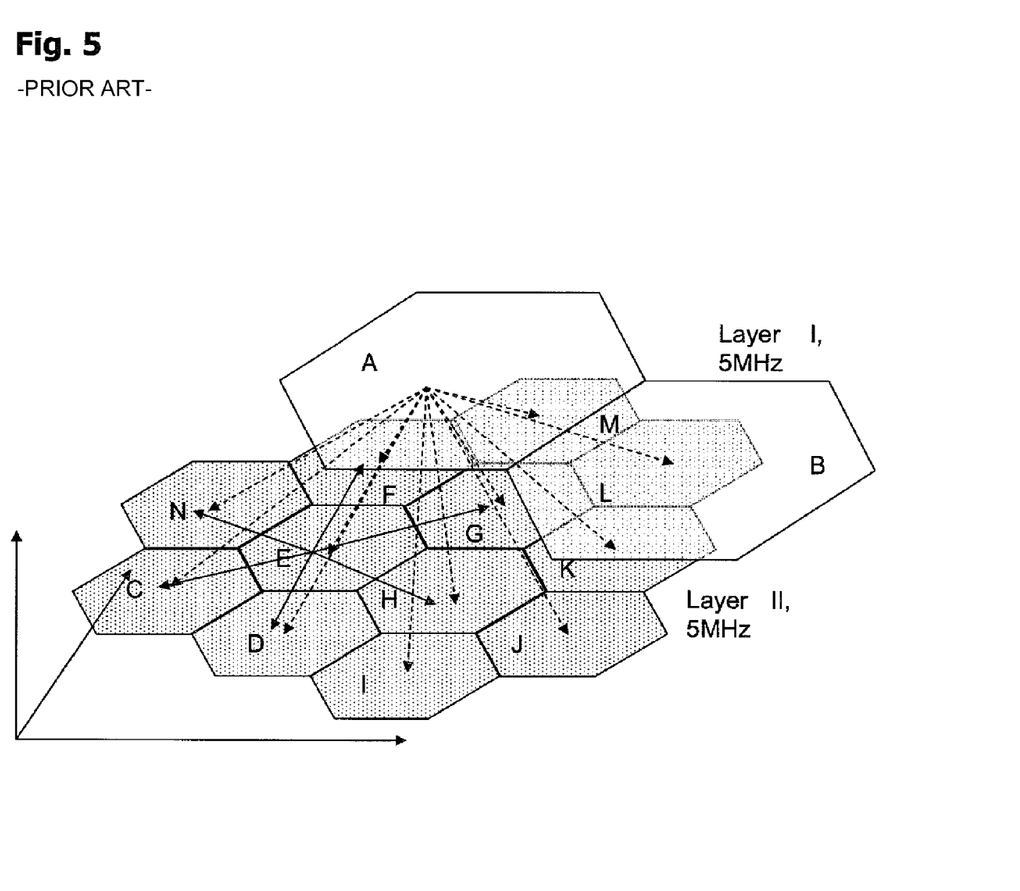
FIG. 5 illustrates an example of a hierarchical cell structure.

FIG. 5 illustrates an example of a hierarchical cell structure. As illustrated in FIG. 5, cells with different sizes are deployed in different frequencies, with cell A and B of Layer I referred to as macro cells and the remaining cells shown from C to N referred to as micro cells with respect to the underlying Layer II.

The capacity of the Layer II micro cells, or the data rate per square km, is much higher because the capacity per cell for macro and micro cells is roughly the same and the number of micro cells in a given area is much higher than the number of macro cells. However, UEs 1 that are moving quickly will need to reselect cells very frequently due to the much smaller cell size.

In the example Illustrated in FIG. 5, macro layer Layer I must broadcast all cells from the micro layer Layer II, such that cell A would need to broadcast all the micro cells that are in the coverage area of the macro cell in addition to the neighbors of the same layer. Therefore, the burden on the system information volume is very high for the macro cells because there are many more micro cells in the coverage area of a macro cell. Furthermore, a UE 1 in a macro cell must measure on many more frequencies than a UE in a micro cell.

The overhead due to broadcasting of the neighboring cells becomes excessive if there are many different frequencies and technologies that must be listed as neighboring cells. Furthermore, the impact on the UE 1 consumption when the UE must measure on many cells simultaneously becomes very high.

SUMMARY OF THE INVENTION

In one aspect of the present invention, a method for providing communication services to a mobile terminal is provided. The method includes receiving first system information from a first network node in a first communication cell currently selected by the mobile terminal, the first system information comprising a first list of network nodes that the mobile terminal is allowed to select from the currently selected communication cell, receiving second system information from at least a second network node that the mobile terminal approaches, the second system information comprising at least a second list of candidate neighbor network nodes available for selection by the mobile terminal in the at least second network node and adjusting the first list by combining the first list with the at least second list, wherein the first system information and the second system information are received on the same frequency.

It is contemplated that combining the first list with the at least second list comprises adding to the first list, only those candidate neighbor network nodes indicated in the at least second list that are not already indicated in the first list. It is further contemplated that combining the first list with the at least second list comprises adding to the first list, candidate neighbor network nodes indicated in the at least second list only if the at least a second network node is indicated in the first list.

In another aspect of the present invention, a method for providing communication services to a mobile terminal is provided. The method includes receiving first system information from a first network node in a first communication cell currently selected by the mobile terminal, the first system information received on a first frequency and comprising a first list of network nodes that the mobile terminal is allowed to select from the currently selected communication cell, receiving second system information from at least a second network node that the mobile terminal approaches, the second system information received on at least a second frequency and comprising at least a second list of candidate neighbor network nodes available for selection by the mobile terminal in the at least second network node and adjusting the first list by combining the first list with the at least second list, wherein the first frequency is different than the at least second frequency.

It is contemplated that combining the first list with the at least second list comprises adding to the first list, only those candidate neighbor network nodes indicated in the at least second list that are not already indicated in the first list. It is further contemplated that combining the first list with the at least second list comprises adding to the first list, candidate neighbor network nodes indicated in the at least second list only if the at least a second network node is indicated in the first list.

In another aspect of the present invention, mobile terminal for communication services is provided. The terminal includes a receiving unit receiving first system information from a first network node in a first communication cell currently selected by the mobile terminal and receiving second system information from at least a second network node that the mobile terminal approaches, the first system information received on a first frequency and comprising a first list of network nodes that the mobile terminal is allowed to select from the currently selected communication cell and the second system information received on at least a second frequency and comprising at least a second list of candidate neighbor network nodes available for selection by the mobile terminal in the at least second network node, a display unit displaying information, an input unit receiving inputs from a user and a processing unit adjusting the first list by combining the first list with the at least second list.

It is contemplated that the first frequency and the at least second frequency are the same. It is further contemplated that the first frequency and the at least second frequency are different.

It is contemplated that combining the first list with the at least second list comprises adding to the first list only those candidate neighbor network nodes indicated in the at least second list that are not already indicated in the first list. It is further contemplated that combining the first list with the at least second list comprises adding to the first list candidate neighbor network nodes indicated in the at least second list only if the at least a second network node is indicated in the first list.

In another aspect of the present invention, a network for providing communication services to a mobile terminal is provided. The network includes a receiver receiving first system information from a first network node in a first communication cell currently selected by the mobile terminal and receiving second system information from at least a second network node that the mobile terminal approaches, the first system information received on a first frequency and comprising a first list of network nodes that the mobile terminal is allowed to select from the currently selected communication cell and the second system information received on at least a second frequency and comprising at least a second list of candidate neighbor network nodes available for selection by the mobile terminal in the at least second network node, and a controller adjusting the first list by combining the first list with the at least second list.

It is contemplated that the first frequency and the at least second frequency are the same. It is further contemplated that the first frequency and the at least second frequency are different.

It is contemplated that combining the first list with the at least second list comprises adding to the first list only those candidate neighbor network nodes indicated in the at least second list that are not already indicated in the first list. It is further contemplated that combining the first list with the at least second list comprises adding to the first list candidate neighbor network nodes indicated in the at least second list only if the at least a second network node is indicated in the first list.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Several possibilities exist for reducing the size of a neighboring cell list.

One possibility for reducing the size of a neighboring cell list is to combine different cell information lists. A UE 1 may combine information from different cells if the UE is able to simultaneously receive system information from the different cells. This can reduce the number of neighboring cells that must be broadcast on one cell.

Normally, it is possible for a UE 1 to receive system information of the best neighboring cell when the UE is in between two different cells. Therefore, the UE 1 may combine the cell information lists of a neighboring cell with the cell list that the UE has read on the cell on which it is camping.

Figure 6:
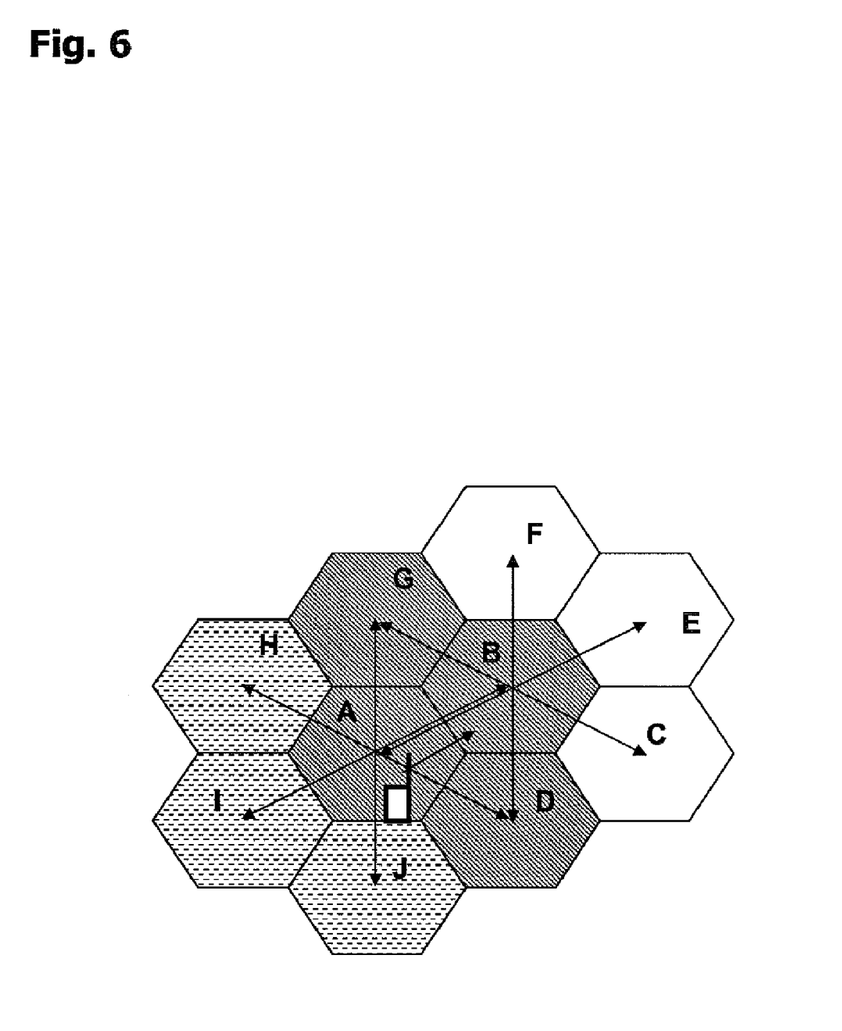
FIG. 6 illustrates merging of intra-frequency neighboring cell lists.

FIG. 6 illustrates an example of merging intra-frequency neighboring cell lists. As illustrated in FIG. 6, a UE 1 is camping on cell A having the neighboring cell lists B, G, H, I, J, D. The UE 1 would include the neighboring cell list broadcast on cell B as the UE moves toward cell B. Specifically, the UE 1 would include cells F, E and C and ignore cells A, B, D and G since these cells would already be present in the neighboring cell list of cell A on which the UE is camping.

The combining of cells could depend on a specific condition, such as when the neighboring cell from which the UE 1 reads the cell information list is suitable. Conditions for the selection of the neighboring cell from which the UE 1 should read the system information could be specified.

For example, a condition may be that the UE 1 should only combine the neighboring cell information lists from a fixed number of neighboring cells, such as the 'x' highest ranked cells. Specifically this could be done for neighboring cells that are listed in the current cell and for which it is indicated that the UE 1 is allowed to combine the neighboring cell information list.

This combining results in each cell having to broadcast less neighboring cells since the UE 1 will add additional neighboring cells from the direction in which the UE moves. Only the information contained in the system information of the cell on which the UE 1 is camping should be kept If there are cells listed several times.

Similarly, special handling may be required for specific offsets for cell C that is listed as a neighbor of cell B from which the UE 1 reads the system information in order to add the neighboring cell information list of cell B to the neighboring cell information list of cell A. For example, the UE 1 could add the difference of the transmission power between cells A and B to the offset indicated for cell C in the neighboring cell information list of cell B.

Combining may also be possible for inter-frequency cells when, for example, two 5 MHz cells are used instead of one 10 MHz cell. This would facilitate use of Hierarchical Cell Structure (HCS) and increase the overall capacity.

Figure 7:
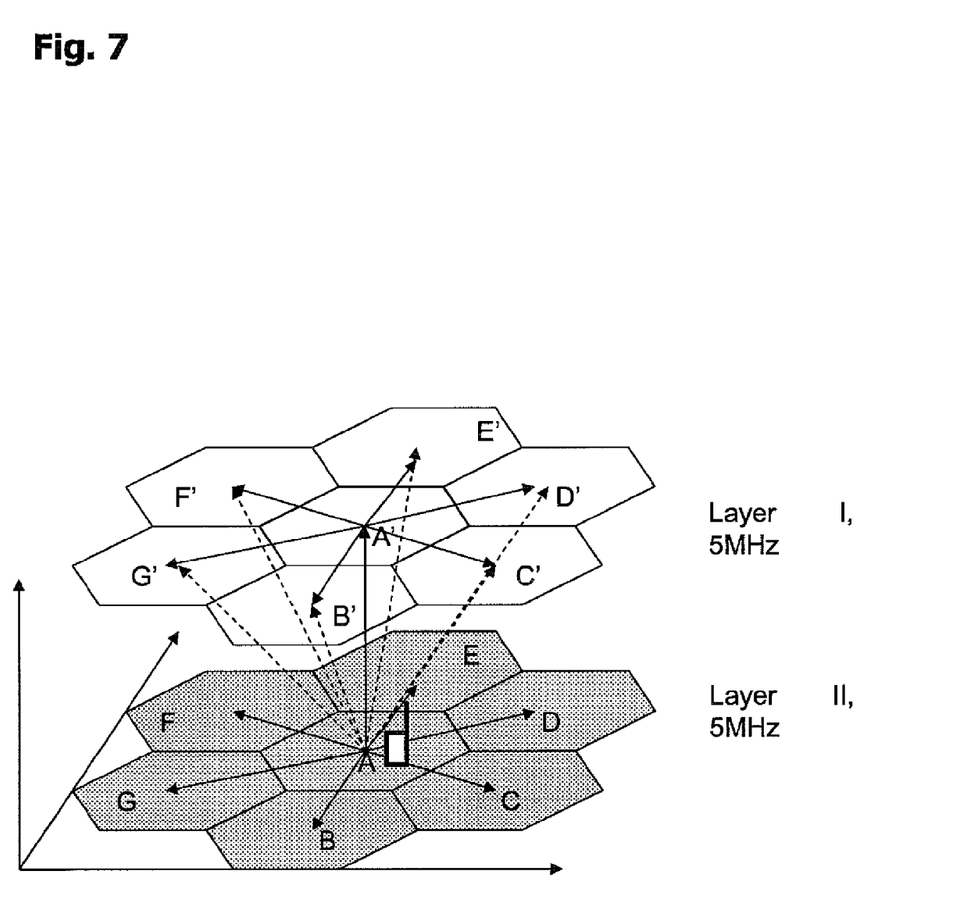
FIG. 7 illustrates merging of inter-frequency neighboring cell lists.

FIG. 7 illustrates an example of merging inter-frequency neighboring cell lists. As illustrated in FIG. 7, a UE 1 camping on cell A on frequency Layer II could combine the intra-frequency cell information list of cell A on which it is camping, which includes cells B, C, D, E, F and G, with the intra-frequency cell information list of cell A' on frequency Layer I, which includes cells B', C', D', E', F' and G'. This would allow the network to avoid having to send the inter-frequency neighboring cell lists.

Another possibility for reducing the size of a neighboring cell list is using blacklists. Cells that a UE 1 is not allowed to select would be listed in a blacklist. The blacklisted cells could include cells that are reserved for operator use, cells that are reserved for future extension or cells that cannot be reasonably considered as neighboring cells because a UE 1 cannot normally pass from one cell to another. Examples are cells that are separated by a river and micro cells that are in two different skyscrapers.

A problem exists when the blacklist becomes bigger than a corresponding white list. This approach is feasible for both intra-frequency and inter-frequency cells.

Another possibility for reducing the size of a neighboring cell list is indicating a source cell in the target cell. A UE 1 could check system information of the target cell to determine whether the cell on which it is currently camping is indicated as a neighboring cell of the target cell. The UE 1 would not be allowed to reselect if the source cell is not indicated as a neighboring cell. This approach is only feasible for intra-frequency cells.

Indicating a source cell in the target cell can reduce the list of neighboring cells in certain situations, specifically for large cells, since a large cell has more neighboring cells than a small cell and also allows the broadcasting of cell specific offsets. However, the UE 1 still might unnecessarily read the system information of the neighboring cell.

Another possibility for reducing the size of a neighboring cell list is a partial neighboring list. It is possible to indicate only neighboring cells in the cell list that need specific treatment. This approach is feasible for both intra-frequency and inter-frequency cells.

The present invention provides a method that reduces the overhead of the neighboring cells that must be signaled, which reduces the overhead in the system information, and also reduces the number of cells on which a UE 1 must perform measurements. It is important to reduce the number of neighboring cells broadcast in the system information, both for inter-frequency and Inter—Radio Access Technology (inter-rat).

The present invention proposes that a UE 1 might reselect between cells for which no detailed information on cells, such as frequency and type of Radio Access Technology (RAT) and cell specific information, such as a cell specific scrambling code or Base Station Identity Code (BSIC), is sent on the cell on which the UE 1 is currently camping. The methods of the present invention still facilitate efficient UE 1 measurement mechanisms.

It is assumed that a UE 1 in an LTE system is able to receive a minimum bandwidth of 10 MHz and the minimum bandwidth for a cell is 1.25 MHz. Eight cells of 1.25 MHz could be collocated on different frequencies in the worst case of a hierarchical cell structure, as illustrated in FIGS. 4 and 5. This would imply a huge number of neighboring cells. A UE 1 can read the system information of at least two cells simultaneously, such as from Layer I and Layer II in FIG. 4, instead of indicating all neighbors of one frequency.

LTE might be used particularly in a "hotspot" scenario, where LTE cells would be used as pico cells together with an overlay UMTS/GSM network. This would potentially require that many LTE cells be broadcast in the UMTS/GSM system information if all neighboring cells must be listed.

It is also possible that a UE 1 can read system information from different RATs and combine the cell information lists from system information for different cells if cells from different RATs, or cells from the same RAT on different frequencies, are co-located in the same area. This would depend on the receiver structure. However it is important that a UE 1 perform measurements only when it is necessary in order to reduce battery consumption.

Linking neighboring cells together, such as by indicating to a UE 1 that cells in the same area have similar coverage, would allow the UE to perform measurements only when there is a high likelihood of having good reception quality. This would reduce the number of neighboring cells on which the UE 1 should perform measurements, specifically the number of inter-frequency and inter-rat neighboring cells on which the UE should perform measurements.

For example, a UE 1 that has selected a first cell would start measurements on a third cell only if a second cell to which the third cell is linked has reached a predefined quality target. In the example illustrated in FIG. 4, the first cell could be cell A, the second cell could be cell B and the third cell could be cell B'.

Several detailed concepts are explained that allow a reduction in the number of neighboring cells that must be broadcast and the number of cells on which a UE 1 must perform measurements. Two scenarios are differentiated since they are very common and are most in need of enhancement.

The first scenario is a macro cell that covers the same area as many micro, or pico, cells. The potential number of neighboring cells that must be broadcast and that must be measured by a UE 1 would be very high.

The second scenario is collocated cells. The easiest way to increase capacity is to add other frequencies on the existing base stations, which doubles the number of neighboring cells that must be broadcast.

One possibility is to list the frequencies of the neighboring cells, such as the center frequency and bandwidth, for each type of radio access technology instead of indicating the neighboring cell list in a different layer. The UE 1 can then limit the search of neighboring cells on a given layer. The UE 1 would need to read the system information, or at least parts of the system information, of the cells in a different layer in order to determine whether the cells present can be selected once the UE has detected the presence of neighboring cells in the different layer.

It is also possible that the UE 1 would only read system information, or parts of it, in a different layer when the quality of the cell is above a certain limit that might be provided via dedicated signaling or on the system information on the cell on which the UE is currently camping. This would reduce the time spent performing quality measurements or receiving system information of the neighboring cells.

It is also possible to indicate to the UE 1, via the system information or via dedicated signaling in the cell on which the UE is currently camping, a list of cells that the UE should not select to, or a "black list." This would prevent the UE 1 from considering specific cells on a different layer in the vicinity of the current cell in the evaluation and prevent the UE 1 from reading system information unnecessarily.

Specifically, in a hierarchical cell structure, it is not necessary for a UE 1 camping on a macro cell to read the system information of smaller cells in a different layer immediately after entering a new macro cell since selecting to a smaller cell is only useful when the UE has a relatively low speed. Therefore, another enhancement when all neighboring cells in different layers are not broadcast could be that the UE 1 only reads system information on a given layer a specified time after entering the macro cell, such that the UE starts to receive system information or measure on a specific layer only after the specified time has elapsed after cell reselection in order to prevent unnecessary measurements and unnecessary reception of system information.

Another possibility is to send different pilots of cells in a given layer in a Single Frequency Network (SFN) operation where neighboring cells in the same frequency band send the same time-aligned information such that UEs 1 perceive the signal received from different antennas as having been sent from one antenna. This method can be used for efficient cell search in order to send a specific carrier for a given cell group.

This method can be used in such a configuration in order to allow measurement of reception quality of a given layer and thereby only the pilot sequences indicated on the cell on which the UE 1 is currently camping need be indicated instead of indicating the different cells. The UE 1 would start to determine specific cells using a pilot that is, for example, the strongest, and start to receive the system information of that cell only after the quality of the pilot sequence measured by the UE has exceeded a certain threshold.

It is possible to indicate in a different cell that is much better from a radio point of view, such as cell B, the list of cells from which the UE 1 is allowed to select to cell B in order to prevent the UE from selecting from a given cell, such as cell A, to the different cell unnecessarily, such as for Radio Resource Management (RRM) reasons. For example, if a UE 1 is allowed to select to cell B only from cell C, then only cell C would be indicated in the "allowed source cell list" sent on the system information of cell C and a UE from cell A would not select cell B after receiving system information from cell B. Another possibility would be to indicate cell A in a "forbidden source cell" list.

The intra-frequency neighboring cells that must be broadcast for each layer are normally similar for co-located cells, where the same locations are used for cells from several different RATs or frequencies, as illustrated in FIG. 4. As illustrated in FIG. 4, the intra-frequency neighbors of cell A' in Layer I are cells B', C', D', E', F' and G' and the intra-frequency neighbors of cell A in Layer II are cells B, C, D, E, F and G.

Therefore, an efficient solution for reducing the numbers of neighboring cells that must be broadcast would be to create a rule that allows determination of a list of neighboring cells in a different layer from the list of neighboring cells of the cell on which the UE 1 is camping. In the example illustrated in FIG. 4, when a UE 1 camping on cell A' of Layer I receives the information on the neighboring cells B', C', D', E', F' and G', it is sufficient to add the information that the same neighbors are also available on Layer II and thereby the UE can assume that the neighboring cells in Layer II are cells A, B, C, D, E, F and G and that these cells are also included in the neighboring cell list.

For non collocated cells, where cells on different layers are not co-located, it is also be possible to indicate one or several cells, such as cells A' and B', that are potentially in a different layer than a cell with similar coverage from the current cell that the UE 1 has selected, such as cell A, and indicate that the UE is also allowed to select to neighboring cells indicated as intra-frequency or inter-frequency cells in the system information of cell A' and B'. Other specific rules could also be defined, such as indicating in the neighboring cell list of cells, such as A' and B', which portion of the cell information list may be combined with a given cell on which the UE 1 is camping.

Generally, one possibility for reducing the number of cells on which a UE 1 performs measurements is to indicate for cells of different layers which intra-frequency cells have similar coverage, such as similar coverage collocated cells or cells that have larger or smaller coverage. The UE 1 would then only start to measure the cells of different layers after one or several of the cells with similar coverage has a certain quality.

Another possibility is to give a specific identification on the cell on which the UE is camping that is broadcast on the system information of the neighboring cells. The UE 1 can then identify that the cell belongs to a set of allowed cells using this identification.

The present invention may be used in order to reduce the number of cells that must be broadcast and the number of cells that a UE 1 must measure. The present invention is applicable to the LTE standards as well as to existing standards, such as GSM or UMTS.

Figure 8:
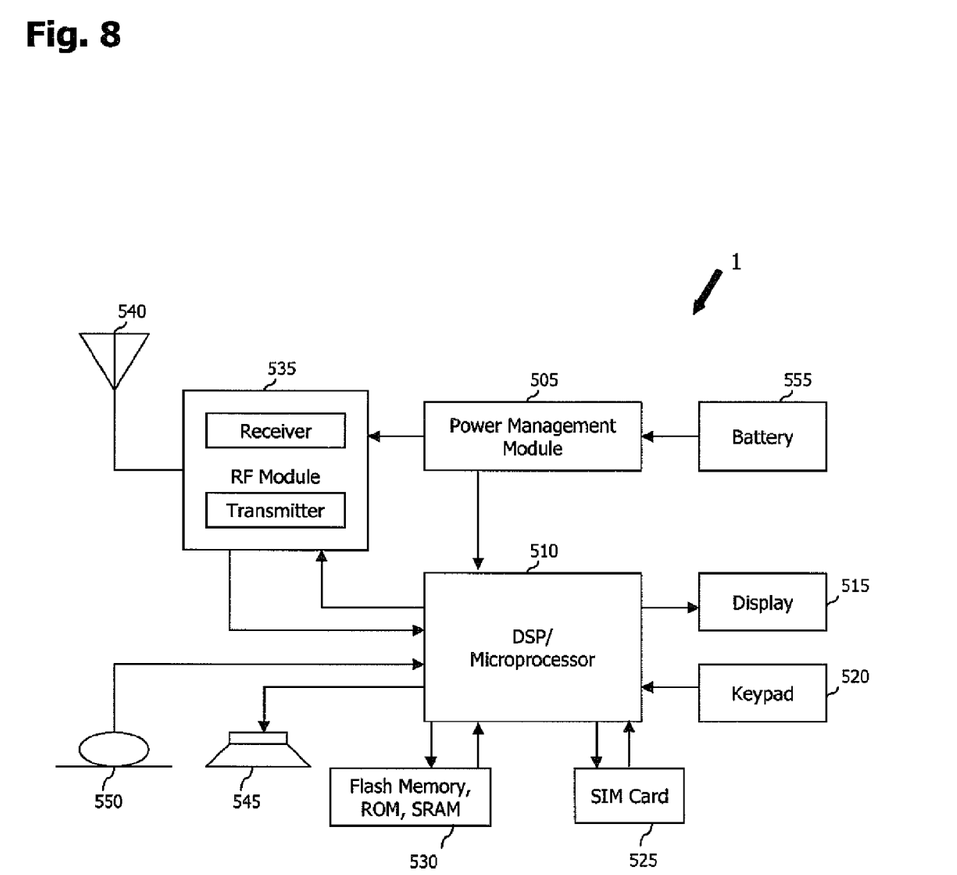
FIG. 8 illustrates a block diagram of a mobile station (MS) or user equipment (UE) according to the present invention.

FIG. 8 illustrates a block diagram of a mobile station (MS) or UE 1. The UE 1 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for providing communication services to a mobile terminal, the method comprising:
    receiving first system information from a first network node in a first communication cell currently selected by the mobile terminal, the first system information comprising a first list of network nodes that the mobile terminal is allowed to select from the currently selected communication cell;
    receiving second system information from at least a second network node that the mobile terminal approaches, the second system information comprising at least a second list of candidate neighbor network nodes available for selection by the mobile terminal in at least the second network node,
    wherein the second system information also comprises a list of network nodes that the mobile terminal is not allowed to select in at least the second network node, wherein the list of network nodes the mobile terminal is not allowed to select comprises network nodes reserved for operator use, network nodes reserved for future extension or network nodes not considered neighboring network nodes; and
    adjusting the first list by combining the first list with at least the second list,
    wherein the first system information and the second system information are received on the same frequency.

2. The method of claim 1, wherein combining the first list with at least the second list comprises adding to the first list, only those candidate neighbor network nodes indicated in at least the second list that are not already indicated in the first list.

3. The method of claim 1, wherein combining the first list with at least the second list comprises adding to the first list, candidate neighbor network nodes indicated in at least the second list only if at least the second network node is indicated in the first list.

4. A method for providing communication services to a mobile terminal, the method comprising:
    receiving first system information from a first network node in a first communication cell currently selected by the mobile terminal, the first system information received on a first frequency and comprising a first list of network nodes that the mobile terminal is allowed to select from the currently selected communication cell;
    receiving second system information from at least a second network node that the mobile terminal approaches, the second system information received on at least a second frequency and comprising at least a second list of candidate neighbor network nodes available for selection by the mobile terminal in at least the second network node,
    wherein the second system information also comprises a list of network nodes that the mobile terminal is not allowed to select in at least the second network node, wherein the list of network nodes the mobile terminal is not allowed to select comprises network nodes reserved for operator use, network nodes reserved for future extension or network nodes not considered neighboring network nodes; and
    adjusting the first list by combining the first list with at least the second list,
    wherein the first frequency is different from at least the second frequency.

5. The method of claim 4, wherein combining the first list with at least the second list comprises adding to the first list, only those candidate neighbor network nodes indicated in at least the second list that are not already indicated in the first list.

6. The method of claim 4, wherein combining the first list with at the least second list comprises adding to the first list, candidate neighbor network nodes indicated in at least the second list only if at least the second network node is indicated in the first list.

7. A mobile terminal for communication services, the mobile terminal comprising:
    a receiving unit receiving first system information from a first network node in a first communication cell currently selected by the mobile terminal and receiving second system information from at least a second network node that the mobile terminal approaches, the first system information received on a first frequency and comprising a first list of network nodes that the mobile terminal is allowed to select from the currently selected communication cell and the second system information received on at least a second frequency and comprising at least a second list of candidate neighbor network nodes available for selection by the mobile terminal in at least the second network node,
    wherein the second system information also comprises a list of network nodes that the mobile terminal is not allowed to select in at least the second network node, wherein the list of network nodes the mobile terminal is not allowed to select comprises network nodes reserved for operator use, network nodes reserved for future extension or network nodes not considered neighboring network nodes;
    a display unit displaying information;
    an input unit receiving inputs from a user; and
    a processing unit adjusting the first list by combining the first list with at least the second list.

8. The mobile terminal of claim 7, wherein the first frequency and at least the second frequency are the same frequency.

9. The mobile terminal of claim 7, wherein the first frequency and at least the second frequency are different frequencies.

10. The mobile terminal of claim 7, wherein combining the first list with at least the second list comprises adding to the first list only those candidate neighbor network nodes indicated in at least the second list that are not already indicated in the first list.

11. The mobile terminal of claim 7, wherein combining the first list with at least the second list comprises adding to the first list candidate neighbor network nodes indicated in at least the second list only if at least the second network node is indicated in the first list.

12. A network providing communication services to a mobile terminal, the network comprising:

a receiver receiving first system information from a first network node in a first communication cell currently selected by the mobile terminal and receiving second system information from at least a second network node that the mobile terminal approaches, the first system information received on a first frequency and comprising a first list of network nodes that the mobile terminal is allowed to select from the currently selected communication cell and the second system information received on at least a second frequency and comprising at least a second list of candidate neighbor network nodes available for selection by the mobile terminal in at the least second network node, wherein the second system information also comprises a list of network nodes that the mobile terminal is not allowed to select in at least the second network node, wherein the list of network nodes the mobile terminal is not allowed to select comprises network nodes reserved for operator use, network nodes reserved for future extension or network nodes not considered neighboring network nodes; and a controller adjusting the first list by combining the first list with at least the second list.

13. The network of claim 12, wherein the first frequency and at least the second frequency are the same frequency.

14. The network of claim 12, wherein the first frequency and at least the second frequency are different frequencies.

15. The network of claim 12, wherein combining the first list with at least the second list comprises adding to the first list only those candidate neighbor network nodes indicated in at least the second list that are not already indicated in the first list.

16. The network of claim 12, wherein combining the first list with at least the second list comprises adding to the first list candidate neighbor network nodes indicated in at least the second list only if at least the second network node is indicated in the first list.

* * * * *